United States Patent
Godlewski et al.

(10) Patent No.: US 9,666,319 B2
(45) Date of Patent: May 30, 2017

(54) METHOD FOR TREATING AN ABSORBER PIN CONTAINING CONTAMINATED BORON CARBIDE AND SODIUM

(71) Applicant: COMMISSARIAT A L'ENERGIE ATOMIQUE ET AUX ENERGIES ALTERNATIVES, Paris (FR)

(72) Inventors: Joel Godlewski, Aix en Provence (FR); Olivier Gastaldi, Jouques (FR); Bruno Pelisset, Digne les Bains (FR); Arnaud Leclerc, Manosque (FR); Gwendal Blevin, Pertuis (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/903,509

(22) PCT Filed: Jul. 8, 2014

(86) PCT No.: PCT/FR2014/051751
§ 371 (c)(1),
(2) Date: Jan. 7, 2016

(87) PCT Pub. No.: WO2015/004382
PCT Pub. Date: Jan. 15, 2015

(65) Prior Publication Data
US 2016/0163405 A1    Jun. 9, 2016

(30) Foreign Application Priority Data

Jul. 8, 2013  (FR) ..................... 13 56713

(51) Int. Cl.
*G21F 9/30* (2006.01)
*G21C 21/18* (2006.01)
*G21F 9/28* (2006.01)
*G21C 7/10* (2006.01)

(52) U.S. Cl.
CPC ................ *G21F 9/30* (2013.01); *G21C 7/10* (2013.01); *G21C 21/18* (2013.01); *G21F 9/28* (2013.01); *Y02E 30/39* (2013.01)

(58) Field of Classification Search
CPC ..... G21F 9/06; G21F 9/28; G21F 9/30; G21C 7/10; G21C 21/18; Y02E 30/39
See application file for complete search history.

(56) References Cited

U.S. PATENT DOCUMENTS

| 5,629,965 A * | 5/1997 | Soga ........................ G21C 7/10 376/327 |
| 8,206,677 B2 | 6/2012 | Sellier et al. |
| 9,123,448 B2 | 9/2015 | Sellier et al. |
| 2008/0003164 A1 * | 1/2008 | Carra ........................ G21F 9/28 423/421 |

FOREIGN PATENT DOCUMENTS

WO    2010/007236 A1    1/2010

OTHER PUBLICATIONS

International Search Report, dated Oct. 27, 2014, from corresponding PCT Application.

* cited by examiner

*Primary Examiner* — Richard M Rump
(74) *Attorney, Agent, or Firm* — Young & Thompson

(57) ABSTRACT

Disclosed is a method for treating an absorber pin, wherein the pin comprises a cladding in which a sintered boron carbide-based material having cracks is located, the material having porosity less than 1% of the volume of the material, the cracks containing sodium and at least one radioactive material. The method includes contacting the material with a treatment reaction mixture including carbon dioxide and water, in such a manner that the production of sodium carbonate and the expansion thereof cause the opening of cracks and of the sheath from at least one slit provided in the sheath as well as the propagation of the treatment process within the material. The process overcomes the physical-chemical properties of a sintered boron carbide-based material as much as possible. These properties prevent an easy treatment of the sodium and radioactive material contained in the cracks of the material.

14 Claims, No Drawings

METHOD FOR TREATING AN ABSORBER PIN CONTAINING CONTAMINATED BORON CARBIDE AND SODIUM

TECHNICAL FIELD

The present invention relates to the field of the treatment of nuclear waste.

It relates in particular to the treatment of waste containing sodium and at least one radioactive substance. One such waste is for example a pin for controlling the reactivity of a sodium-cooled Fast Neutron Reactor ("FNR-Na").

TECHNICAL BACKGROUND

In order to control nuclear reactivity, "FNR-Na" reactors use a neutron absorbing material containing boron carbide of simplified formula $B_4C$.

This material is generally in the form of sintered cylindrical pellets stacked in a cladding, in order to form an absorbing element such as an absorber pin.

Under the combined action of temperature and irradiation, the initially massive boron carbide pellets may be degraded until cracks appear in the pellets.

During operation of the "FNR-Na" reactor, the sodium in the primary circuit is in liquid form and contains at least one radioactive substance. It circulates in the space between the boron carbide pellets and the cladding. Following degradation of the pellets, the liquid sodium contaminated with the radioactive substance may then penetrate into the cracks in the boron carbide pellets, or even along the fractures of the boron carbide pellets when the cracks have led to fragmented pellets. In the present description, the fractures are classed as cracks.

After stopping the reactor, the absorber pins are extracted from the reactor and then put in storage before treatment. The absorber pin then comprises cracked boron carbide pellets, in which the cracks contain sodium which is in solid form and is contaminated with at least one radioactive substance.

The contaminated absorber pin constitutes nuclear waste that poses a dual risk in terms of safety and security:
- a chemical risk due to the residual sodium, which must be kept under an inert gas (such as argon or nitrogen) so that there is no risk of chemical reaction, for example with water or with the oxygen of the air. Depending on the conditions of storage before treatment, a proportion of the sodium at the surface may nevertheless be transformed, for example to soda and to hydrogen on contact with water, and in an uncontrolled manner;
- a radiological risk due to contamination of the sodium with the radioactive substance, namely the radioactive isotopes from the primary circuit of the reactor.

In order to be able to treat such nuclear waste through the conventional channels for removal of contaminated waste, it is firstly necessary to eliminate the chemical risk, i.e. to transform chemically or extract the contaminated metallic sodium present in the absorber pin, in particular in the cracks in the boron carbide pellets.

A method for chemical transformation of sodium by direct reaction between water and sodium is difficult to implement: it requires bringing these two chemical species into contact, but also requires control of the reaction kinetics, disposal of the soda and hydrogen produced, as well as absence of accumulation of reagents.

Now, sintered boron carbide is a chemically stable material of low porosity, the porosity generally representing less than 1% of the volume of the material. The sodium is therefore very confined within this material. Consequently, numerous cutting operations on the cladding would be required for treating the sodium-boron carbide radioactive mixture. However, this operation is long and difficult, as the hardness of the boron carbide pellets is such that it would damage and contaminate the cutting tools.

The presence of a radioactive substance also means working in a confinement enclosure under inert gas, such as a glove box. Now, the cutting operations are also difficult there, because of the difficulties of manipulation intrinsic to this type of enclosure. Moreover, they would generate dispersion of radioactive substance in the enclosure, which must be limited as far as possible.

The poor accessibility of the contaminated sodium therefore complicates its treatment as waste considerably.

SUMMARY OF THE INVENTION

One of the aims of the invention is therefore to avoid or attenuate one or more of the drawbacks described above, by carrying out a method which among other things allows easy treatment of the sodium and radioactive substance contained in the cracks of a material based on sintered boron carbide, which is a chemically stable material of great hardness, the sodium to be treated being difficultly accessible because it is contained within the cracks.

The invention thus relates to a method for treating an absorber pin, the pin comprising a cladding in which there is a material based on sintered boron carbide that has cracks, the cracks containing sodium and at least one radioactive substance.

The method comprises a treatment step, during which the sodium is converted to sodium carbonate by a carbonation reaction by contacting the material with a treatment reaction mixture comprising in molar percentage 0.5% to 5% of steam, 5% to 25% of carbon dioxide and 74.5% to 94.5% of a chemically inert gas, in such a way that expansion of the carbonate causes opening up of the cracks and of the cladding starting from at least one slit made in the cladding as well as propagation of the method of treatment within the material.

The treatment step comprises contacting the material with a treatment reaction mixture in order to carry out a carbonation reaction in which the soda obtained by a hydrolysis reaction, after contacting steam with sodium, is converted to carbonate after reaction with the carbon dioxide contained in the treatment reaction mixture.

The treatment reaction mixture comprises reagents in gaseous form. It therefore comes into contact more easily with the difficultly accessible sodium that is contained in the cracks in the boron carbide pellets, or even with the sodium present on the fractures or on the interfaces of the individual pellets of sintered boron carbide. This performance cannot be achieved by a method of treatment using only water, even in large amounts.

The carbonation reaction employed according to the treatment step generates a carbonate composed essentially of sodium carbonate $Na_2CO_3$ and/or sodium hydrogen carbonate $NaHCO_3$, which in the present description is classed with the sodium carbonate. The volume occupied by the carbonate is greater than the volume initially occupied by the sodium.

The carbonation reaction is then carried out in such a way that the volume expansion of the carbonate advantageously causes widening of the cracks and opening up of the cladding, the latter having previously been weakened mechanically by making at least one slit. The openings thus produced open the way for continuation of the carbonation reaction and its propagation to zones that were initially inaccessible to the reagents, namely water and carbon dioxide. All of the sodium contained in the cladding can then be treated.

The slit is preferably longitudinal and/or made on the entire length of the cladding.

As the cladding is generally made of metal, most often composed of stainless steel, the slit is for example made using a laser.

If applicable, the ends of the cladding may be cut along a transverse plane in order to increase the kinetics of the chemical reactions employed during the steps of pretreatment and treatment.

Following opening up of the cracks and of the cladding, the carbonation reaction according to the treatment step continues by gradual increase in the area of contact between the sodium and the gaseous reaction mixture.

Thus, opening up of the cracks and of the cladding causes acceleration of the carbonation reaction, which can then be propagated into the whole of the cladding so as to treat all of the sodium.

This result is obtained despite the fact that the cracks are not generally connected and constitute confined reaction spaces. These spaces prevent or limit a priori the propagation of the carbonation reaction, or of the hydrolysis reaction using only water, which is envisaged conventionally for this type of treatment.

Despite the poor initial accessibility of the sodium contained in the cracks in the material, the treatment reaction mixture can react in depth and completely with the contaminated sodium. The cladding can then be treated by means of the method of the invention without the need for numerous cutting operations.

This is particularly advantageous, because owing to the presence of a radioactive substance, the method of treatment according to the invention is most often carried out in a confinement enclosure such as a glove box, a hot cell or a chemical reactor, in which, as noted above, one tries to limit the cutting operations.

Moreover, through the use of the carbonation reaction, the method of treatment according to the invention has the advantage that it only produces solid waste (sodium carbonate, boron carbide, cladding and radioactive substance) and gaseous waste (hydrogen). Therefore no liquid or gaseous radioactive effluent is generated.

Sodium carbonate is a product that is stable and inert. It is easy to handle and is compatible with the final outlet channels for the boron carbide pins. It can be stored directly in a long-term deep repository.

The hydrogen produced in the carbonation reaction may be removed by a scavenging gas.

The method of treatment according to the invention is also easily controllable since the carbonation reaction according to the treatment step can be slowed down by decreasing the proportion of steam in the gaseous treatment reaction mixture, or even stopped by replacing this mixture with inert gas. This makes the method of the invention extremely safe.

Associated with its relative simplicity of use, the method of the invention also makes it possible to treat a larger number of absorber pins in a single operation, which constitutes an important economic advantage.

An additional difficulty may nevertheless arise when a crust comprising soda (NaOH) and/or sodium oxide ($Na_2O$) covers at least a portion of the surface delimiting the cracks in the material. Such a crust may form by hydrolysis of the sodium in the presence of water, and then concentration and crystallization of the products obtained. It then covers the sodium present in the cracks and constitutes a protective layer preventing contacting of the treatment reaction mixture with the underlying sodium, and therefore propagation of the carbonation reaction in order to treat the contaminated sodium present under the crust.

For this reason, according to a preferred embodiment of the method of treatment according to the invention, a pretreatment step is carried out in which the material is contacted with a pretreatment reaction mixture comprising in molar percentage 0.5% to 25% of carbon dioxide and a chemically inert gas for the remainder. The pretreatment step precedes the treatment step.

The pretreatment reaction mixture is a dry mixture that does not contain water or contains small amounts of water, so that the carbon dioxide that it contains destroys the crust by converting the soda and/or the sodium oxide to sodium carbonate. The small amounts of water permissible are therefore those that prevent growth of the crust that is greater than its destruction in the pretreatment step.

It comprises a chemically inert gas that has the same properties as the treatment reaction mixture. Any gas that is chemically inert with respect to sodium may be suitable. The inert gas is for example nitrogen, argon or a mixture thereof. The pretreatment reaction mixture and the treatment reaction mixture may be identical.

The chemical composition of the treatment reaction mixture therefore differs essentially from that of the pretreatment reaction mixture by the additional presence of water. This results in simplification of the installation in which the method of treatment according to the invention is carried out, such as a confinement enclosure for example. The number of lines for introducing the reagents into the enclosure is thus limited. This reinforces the confinement of the enclosure and therefore the robustness and safety of the method of treatment despite the presence of a radioactive substance.

The pretreatment step produces sodium carbonate, which is a compound that is also obtained at the end of the treatment step. The chemical composition of the waste obtained at the end of the treatment and pretreatment steps is thus limited. This advantageously reduces the number of disposal channels and of operations necessary for the subsequent treatment of the waste.

DETAILED DESCRIPTION OF THE INVENTION

In the present description of the invention, verbs such as "comprise", "contain", "incorporate", "include" and their conjugated forms are open terms and therefore do not exclude the presence of additional element(s) and/or step(s) that may be added to the initial element(s) and/or step(s) stated after these terms. However, these open terms further relate to a particular embodiment in which only the initial element(s) and/or step(s), excluding all others, are aimed at; in which case the open term further entails the closed term "consist of" or "compose of" and its conjugated forms.

The expression "and/or" is understood to link elements with a view to denoting their individual presence, but also a mixture or combination thereof.

Moreover, unless stated otherwise, the values at the limits are included in the ranges of parameters indicated.

Despite the presence of a radioactive substance, for example cesium or tritium (fission products), cobalt 60 or manganese 54 (activation products), the method of the invention treats the sodium present in the cracks in the material based on sintered boron carbide.

This material is generally in the form of pellets. It is constituted wholly or partly of sintered boron carbide, the composition of which in carbon atoms is generally between 8.8% and 20%, and may therefore optionally vary in this range relative to the stoichiometric formula $B_4C$ corresponding to 20% of carbon atoms, or even have an excess of carbon up to 1 wt %.

The method of treatment according to the invention comprises a treatment step during which the material is brought into contact with a treatment reaction mixture comprising in molar percentage 0.5% to 5% of steam, 5% to 25% of carbon dioxide and 75% to 94.5% of a chemically inert gas. The minor proportion of water in the treatment reaction mixture prevents any condensation of water on the walls of the cladding and thus allows treatment of the sodium in complete safety.

The time of contact of the treatment or pretreatment reaction mixture with the material depends respectively on the amount of crust or sodium to be treated, or also on the composition of the reaction mixture. A person skilled in the art can easily adapt this time in order to obtain treatment of the sodium contained in the absorber pin that is as complete as possible, which is indicated for example by the end of release of hydrogen.

Contacting with the treatment or pretreatment reaction mixture is for example carried out for a duration between 5 hours and 15 days.

It is preferably carried out at a temperature between 40° C. and 55° C. Regarding the treatment step, this prevents the water condensing, even at the maximum concentrations of 5 mol % of steam, and reacting violently with the sodium.

Since the material contains at least one radioactive substance, the treatment according to the invention is most often carried out in a confinement enclosure such as a glove box or a hot cell.

The treatment or pretreatment reaction mixture is then generally introduced into the confinement enclosure at a flow rate allowing its continuous renewal at least once per hour, typically once to twice per hour.

Other aims, features and advantages of the invention will now be stated in the following description of a particular embodiment of the method of the invention, given for purposes of illustration, and not limiting.

DESCRIPTION OF PARTICULAR EMBODIMENTS

The ends of a metal cladding comprising sintered boron carbide pellets that have cracks and that contain sodium and a radioactive substance are cut off using a laser.

Then a longitudinal slit is made in the metal cladding.

In a glove box thermostatically controlled at 45° C., the pellets are brought into contact with a pretreatment reaction mixture with the aim of removing the crust of soda that forms on the surface of the cracks. This mixture contains, in molar percentage, 10% of carbon dioxide and 90% of nitrogen.

The pellets are then brought into contact with a treatment reaction mixture containing, in molar percentage, 3% of steam, 10% of carbon dioxide and 87% of nitrogen.

After some hours, absence of release of hydrogen indicates the end of treatment.

The solid waste obtained, namely sodium carbonate, boron carbide, the cladding and the radioactive substance, may be packaged in order to be removed to the appropriate channels.

The invention claimed is:

1. A method for treating an absorber pin, said pin comprising a cladding in which there is a material based on sintered boron carbide whose porosity represents less than 1% of the volume of the material, the material having cracks that contain sodium and at least one radioactive substance, the method comprising:
   a pretreatment step of contacting the material with a pretreatment reaction mixture consisting essentially of molar percentage 0.5% to 25% of carbon dioxide and a chemically inert gas for the remainder; and
   a treatment step in which the sodium is converted to sodium carbonate by a carbonation reaction by contacting the material with a treatment reaction mixture comprising in molar percentage 0.5% to 5% of steam, 5% to 25% of carbon dioxide and 74.5% to 94.5% of a chemically inert gas, in such a way that expansion of the carbonate causes opening up of the cracks and of the cladding starting from at least one slit made in the cladding as well as the propagation of said method of treatment within the material.

2. The method according to claim 1, wherein the material is in the form of pellets.

3. The method according to claim 1, wherein the boron carbide has a composition of carbon atoms between 8.8% and 20%.

4. The method according to claim 1, wherein the inert gas is nitrogen, argon or a mixture thereof.

5. The method according to claim 1, wherein said contacting with the pretreatment or treatment reaction mixture is carried out at a temperature between 40° C. and 55° C.

6. The method according to claim 1, wherein the method is carried out in a confinement enclosure.

7. The method according to claim 6, wherein the confinement enclosure is a glove box, a hot cell or a chemical reactor.

8. The method according to claim 6, wherein the treatment or pretreatment reaction mixture is introduced into the confinement enclosure at a flow rate allowing continuous renewal at least once per hour.

9. The method according to claim 2, wherein the boron carbide has a composition of carbon atoms between 8.8% and 20%.

10. The method according to claim 2, wherein the inert gas is nitrogen, argon or a mixture thereof.

11. The method according to claim 3, wherein the inert gas is nitrogen, argon or a mixture thereof.

12. The method according to claim 2, wherein contacting with the pretreatment or treatment reaction mixture is carried out at a temperature between 40° C. and 55° C.

13. The method according to claim 3, wherein contacting with the pretreatment or treatment reaction mixture is carried out at a temperature between 40° C. and 55° C.

14. The method according to claim 4, wherein contacting with the pretreatment or treatment reaction mixture is carried out at a temperature between 40° C. and 55° C.

* * * * *